(12) United States Patent
Sayle

(10) Patent No.: US 6,356,863 B1
(45) Date of Patent: Mar. 12, 2002

(54) VIRTUAL NETWORK FILE SERVER

(76) Inventor: Roger Anthony Sayle, 1128 Camino Delora, Santa Fe, NM (US) 87501

( * ) Notice: Subject to any disclaimer, the term of this patent is extended or adjusted under 35 U.S.C. 154(b) by 0 days.

(21) Appl. No.: 09/323,333

(22) Filed: Jun. 1, 1999

Related U.S. Application Data (60) Provisional application No. 60/099,425, filed on Sep. 8, 1998.

(51) Int. Cl.$^7$ .......................... G06F 9/455; G06F 17/30
(52) U.S. Cl. ................ 703/27; 707/4; 707/10; 709/1; 709/219; 709/246
(58) Field of Search .................. 703/27, 24, 22, 703/2, 26; 707/1, 4, 10, 101, 204, 104; 709/1, 200, 201, 202, 203, 217, 218, 219, 230, 246, 300, 303; 711/6

(56) References Cited

U.S. PATENT DOCUMENTS

| | | | |
|---|---|---|---|
| 4,887,204 A | | 12/1989 | Johnson et al. ............... 707/10 |
| 5,109,515 A | | 4/1992 | Laggis et al. .................. 707/10 |
| 5,163,131 A | * | 11/1992 | Row et al. .................... 709/202 |
| 5,165,030 A | | 11/1992 | Barker ......................... 703/20 |
| 5,313,646 A | | 5/1994 | Hendricks et al. .......... 707/101 |
| 5,355,453 A | * | 10/1994 | Row et al. .................... 709/219 |
| 5,388,257 A | | 2/1995 | Bauer ............................ 707/1 |
| 5,454,098 A | * | 9/1995 | Pisello et al. .................. 703/24 |
| 5,463,772 A | * | 10/1995 | Thompson et al. .......... 707/101 |
| 5,584,023 A | * | 12/1996 | Hsu ............................. 707/204 |
| 5,600,833 A | * | 2/1997 | Senn et al. ..................... 707/1 |
| 5,603,019 A | | 2/1997 | Kish ........................... 707/205 |
| 5,634,127 A | * | 5/1997 | Cloud et al. ................. 709/300 |
| 5,636,371 A | * | 6/1997 | Yu ............................... 703/26 |
| 5,701,463 A | | 12/1997 | Malcolm ..................... 707/10 |
| 5,802,366 A | * | 9/1998 | Row et al. .................... 709/303 |
| 5,859,972 A | * | 1/1999 | Subramaniam et al. ..... 709/203 |
| 5,931,918 A | * | 8/1999 | Row et al. .................... 709/300 |
| 5,963,958 A | * | 10/1999 | Cottrill ........................ 707/104 |
| 6,085,199 A | | 7/2000 | Rose ........................... 707/104 |

OTHER PUBLICATIONS

Guber et al., Thomas Model–Based Virtual Document Generation, 1997 Academic Press Limited, Int. J. Human–Computer Studies (Jan. 1997) 46, pp. 687–706.*
N. Finn et al., ATM LAN Emulation, IEEE Communications Magazine, vol. 34, No. 6, Jun. 1996, pp. 96–100.*
M. Brorsson, A Decentralized Virtual Memory Scheme Implemented on an Emulated Multiprocessor, Proceedings of the Twenty–Second Annual Hawaii International Conference on System Sciences, 1989, vol. I: Architecture Track, pp. 286–295.*
A. Svensson, *Software Primatives for Emulation of Multi-processor Architectures*, Proceedings of the Twenty–Third Annual Hawaii International Conference on System Sciences, 1990, vol. I, pp. 48–56.*

* cited by examiner

*Primary Examiner*—Russell W. Frejd
(74) *Attorney, Agent, or Firm*—Stetina Brunda et al.

(57) ABSTRACT

A virtual file server for generating content data in response to computer operating system requests involving a remote file system. According to a preferred embodiment, the virtual file server receives the request, which may be via any of a variety of standard protocols. Content data is generated or retrieved and translated into the format specified by the request. The virtual file content need not be maintained as a stored physical file in the requested format. The requested contents of this virtual file are encoded according to the protocol by which the request was initially received. Once so encoded, the requested content of the virtual file is transmitted in response to the request.

65 Claims, 3 Drawing Sheets

VIRTUAL NETWORK FILE SERVER

CROSS-REFERENCE TO RELATED APPLICATIONS

This non-provisional application claims the benefit of provisional application Ser. No. 60/099,425, Filed Sep. 8, 1998, entitled "VIRTUAL FILE SERVER".

STATEMENT RE: FEDERALLY SPONSORED RESEARCH/DEVELOPMENT (Not Applicable)

BACKGROUND OF THE INVENTION

The present invention relates generally to systems and methods for managing databases, and more particularly, systems and methods for providing file systems that are further capable of receiving and replying to file system requests involving data stored in remote machines through conventional protocol means.

For better or worse, the concept of a "file" is universal in computer science. The notion of a file as a named unit of data storage, and of a file's format, the organization and structure of information in a file, are principles understood by programmers and computer users alike. For these reasons, files have become the major de facto method of communication between programs and computers since the 1950's, but not without introducing the problems of innumerable different file formats, granularity of representation, concurrent and co-operative access.

Since the 1970's, the ability to connect computers to each other over a network has created the desire to share files between different computers. Early attempts only allowed transfer of entire files from one machine to another, using protocols such as "uucp" or "oftp". The mid-1980's saw the introduction of distributed file systems that allow access to files on remote machines as though they were on a local disk. By far the most popular of these standards was SUN Microsystems' Network File System (NFS). Other significant standards include Microsoft's LAN Manager, SMB and CIFS network file systems, and Apple's AppleShare network file system. More recently still, the early 1990's saw the introduction and rise of the World Wide Web (WWW) that allows entire files to be read from an arbitrary host on the Internet using the Hyper Text Transport Protocol (HTTP). Amongst the innovations introduced by HTTP was the concept of htbin or cgi-bin WWW pages, which were files generated on the fly by the remote server. This combined with MIME-types (a file typing system similar to the Macintosh MacOS file system) has revolutionized a significant fraction of the software and computer industry.

(1) NFS Network File System Overview

This section describes the Network File System (NFS) protocol, one of the protocols used by the virtual network file server, originally introduced by SUN Microsystems in 1985. NFS is based upon client-server architecture and provides a means of providing transparent access to remote file systems. A file server is a machine that exports a set of files. Clients are machines that access such files. Clients and servers communicate via "remote procedure calls" which operate as synchronous requests. When an application on the client tries to access a remote file, the kernel sends a request to the server and the client blocks until it receives a reply. The server waits for incoming client requests, processes them and sends replies back to the clients.

(2) User Perspective

An NFS server exports one or more file systems. Each exported file system may be either an entire partition or a subtree thereof. The server can specify, typically through entries in the "/etc/exports" file, which clients may access each exported file system and whether the access permitted is read-only or read-write.

Client machines then mount such a file system, or a subtree of it, onto any directory in their existing file hierarchy, just as they would mount a local file system. The client may mount the directory as read-only, even if the server has exported it as read-write. NFS supports two types of mounts—"hard" and "soft". This influences the client behavior if the server does not respond to a request. If the file system is hard-mounted, the client keeps retrying until a reply is received. For a soft-mounted file system, the client gives up after a while and returns an error. Once the "mount" succeeds, the client may access files in the remote file system using the same operations that apply to local files.

(3) Protocol Design Goals

The original NFS design had the following objectives: NFS should not be restricted to UNIX. Any operating system should be able to implement an NFS server or client. The protocol should not be dependent on any particular hardware. There should be simple recovery mechanisms from server or client crashes. Applications should be able to access remote files transparently, without using special pathnames or libraries and without recompiling. UNIX file system semantics must be maintained for UNIX clients. NFS performance must be comparable to that of a local disk. The implementation must be transport independent.

The single most important characteristic of the NFS protocol is that the server is stateless and does not need to maintain any information about its clients to operate correctly. Each request is completely independent of others and contains all the information required to process it. The server need not maintain any record of past requests from clients, except optionally for caching or statistics gathering purposes.

For example, the NFS protocol does not provide requests to open or close a file, since that would constitute state information that the server must remember. For the same reason, the READ and WRITE requests pass the starting offset as a parameter, unlike "read" and "write" operations on local files, which obtain the offset from the file description.

A stateless protocol makes crash recovery simple. No recovery is required when a client crashes, it simply remounts the file system when it reboots and the server neither knows nor cares. When a server crashes, the client discovers that requests are timing out and simply retransmits them. It continues to resend requests until the server finally answers after it reboots. The client has no way to determine if the server crashed and rebooted or was simply slow. Stateful protocols, however, require crash-recovery mechanisms. The server must detect client crashes and discard any state maintained for that client. When a server reboots, it must notify the clients so that they can rebuild their state on the server.

(4) NFS Network File System Protocol Stack

The NFS protocol stack consists of several components or layers that define how file system operations are converted into packets over a network protocol. At the lowest level of the protocol stack is the network transport layer. Conventionally under NFS, this consists of the UDP (Unreliable Datagram Protocol) internet transport; however, modern implementations also support the TCP (Transmission Control Protocol) internet protocol. The next layer of the NFS protocol stack is SUN Microsystems' XDR (Extended Data Representation) that provides a machine-independent method of encoding data to send over the network. The next layer is SUN Microsystems' RPC (Remote Procedure Call) protocol which defines the format of the XDR packets for all interactions between clients and servers. The next layer above this consists of three components; the NFS, MOUNT and PORTMAP protocols. These peer protocols define an API level interface to contact remote NFS, MOUNT and PORTMAP daemons (nfsd, mount and portmapper) via RPC respectively. Finally, the highest layer is the logical protocol that dictates the order of requests to the PORTMAP daemon (to obtain the ports of the MOUNT and NFS daemons), the MOUNT daemon (to obtain a root file handle of an exported file system) and finally, the NFS daemon (using file handles from the MOUNT daemon or previous NFS replies).

Additionally, it should be mentioned that there are currently two versions of the NFS and MOUNT protocols. The original public implementation consisted of NFS version 2, and MOUNT version 1 protocols. However these have recently been revised as NFS version 3 and MOUNT version 3 to improve performance and support for file systems larger than 2 Gbytes.

(5) Layer 1: UDP/IP and TCP/IP Protocols

The lowest level of the NFS protocol stack is the Internet protocol used as a transport. Originally implementations used the inherently unreliable UDP protocol. This is a connectionless transport mechanism that sends arbitrarily sized data packets between sockets over a network. Although unreliable, the RPC layer of the protocol stack implements a reliable datagram service by keeping track of unanswered requests and retransmitting them periodically until a response is received. UDP was originally used as its implementation offered performance benefits of the reliable connection-oriented TCP; however, with ever improving implementations this difference no longer exists. Although UDP is still the default for most NFS implementations, many support TCP/IP as an alternative and recent WebNFS specifications require support for TCP/IP as a transport.

When using TCP/IP, data transfers are marshaled into packets, allowing the size of the packet to be determined by the server, and hence to detect when a complete request or reply has been received.

(6) Layer 2: Extended Data Representation (XDR)

The XDR standard defines a machine-independent representation for data transmission over a network. It defines several basic data types (such as int, char and string) and rules for constructing complex data types (such as fixed and variable length arrays, structures and unions). This standard handles issues such as byte ordering, word sizes and string formats that may otherwise be incompatible between heterogeneous computers and operating systems at either end of a network connection.

(7) Layer 3: Remote Procedure Call (RPC) Protocol

The SUN RPC protocol specifies the format of communications between clients and servers. The client sends RPC requests to the server, which processes them and returns the results in an RPC reply. The protocol addresses issues such as message format, transmission and authentication, which do not depend upon a specific application of service. SUN RPC uses synchronous requests. When a client makes an RPC request, it blocks until it receives a response. This makes the behavior of RPC similar to that of a local procedure call.

RPC specifies the format of request and reply packets using XDR encoding. An RPC request packet contains a transmission ID, the fact that the packet is a request, the program identifier and program version for which the packet is intended, the procedure within the program to be executed, client authentication information (if any), and procedure specific parameters. An RPC reply packet contains the transmission ID of the request to which it is replying, the fact that the packet is a reply, whether the operation was executed, server authentication information (if any) and procedure specific results. The unique transmission ID allows the client to identify the request for which the response has arrived and allows the server to detect duplicate requests (caused by retransmissions from the client). The program identifier and program version allows a single application (or socket) to service multiple program requests and simultaneously support multiple protocol versions.

RPC uses five authentication mechanisms to identify the caller to the server: AUTH_NULL (no authentication), AUTH_UNIX (UNIX-style credentials, including client machine name, a user ID and one or more group IDs), AUTH_SHORT (a cookie from a previous AUTH_UNIX request), AUTH_DES (Data Encryption Standard authentication) and AUTH_KERB (Kerberos authentication). The idea of AUTH_SHORT is that once a client has been authenticated using AUTH_UNIX credentials, the server generates a short token or cookie that can be used by that client in future RPC requests. This AUTH_SHORT can be deciphered very quickly to identify known clients, providing faster authentication.

(8) Layer 4A: Portmap (rpcbind) Protocol

The first server process (daemon) of the NFS protocol stack is the RPC portmap daemon (also known as rpcbind). This server process provides directory services mapping program identification and program version numbers to BSD-style port numbers for creating socket connections. RPC requests are sent to the server to locate a particular service (such as NFS version 3) on the remote machine, or to register (and unregister) a service on the local machine. This port mapping service means that only the port of the portmap daemon (usually port 111) need be known in advance by a client. The client then interrogates this server to determine whether a mount daemon and NFS daemon are running, and if so their port numbers. A server typically contacts the portmap daemon when it starts up, to inform it of the port number on which it is awaiting requests, and also as the server is shutting down to unregister itself.

(9) Layer 4B: Mount Protocol

The next server process (daemon) of the NFS protocol stack is the mount daemon. The MOUNT protocol is separate from, but related to, the NFS protocol. It provides operating system specific services, such as looking up server path names, validating user identity, and checking access permissions. The mount protocol is kept separate from the NFS protocol to make it easy to implement new access checking and validation methods without changing the NFS protocol. Mount also requires directory path names, where as the NFS protocol is independent of operating system dependent directory syntax. NFS clients must use the MOUNT protocol to get the first file handle, which allows them entry into the remote file system. The mount daemon may also be queried to determine the list of currently exported file systems.

(10) Layer 4C: NFS Protocol

The main and final server process (daemon) of the NFS protocol stack is the NFS daemon itself. This stateless server is responsible for handling all file operation requests, such as read, write and delete. The first public version of the protocol was NFS version 2, which was released in SunOS 2.0 in 1985, and is supported by all NFS implementations. In 1993, an enhanced protocol NFS version 3 was announced and is currently supported by most implementations. (Interestingly, at the time of writing, the current Linux NFS server and kernel implementations only support NFS version 2). NFS version 3 provides several minor changes that increase performance and enable support for file systems larger than 4 Gbytes. All of the procedures in the NFSv2 protocol are assumed to be synchronous, when control returns to the client only after the operation is completed and any data associated with the request is committed to stable storage. In NFSv3 this requirement is relaxed for WRITE requests allowing the client and server to negotiate the use of a COMMIT request, allowing writes to complete much faster. Additionally, NFSv3 returns file attributes after most operations and when reading directories, eliminating the need for many GETATTR calls required when using NFSv2.

(11) NFS Network File System Protocol Specification

The NFSv2 protocol specifies 15 procedures (operations or methods) exported by an NFS server. The RPC procedure numbers are not sequential as two operations were never implemented or obsolete in the version 2 protocol. These are the ROOT (procno=3) and WRITECACHE (procno=7) procedures.

```
                /* NFS version 2 protocol API */
attrstat     GETATTR(fhandle);       /*          proc=1  */
attrstat     SETATTR(sattrargs);     /*          proc=2  */
diropres     LOOKUP(diropargs);      /*          proc=4  */
readlinkres  READLINK(fhandle);      /*          proc=5  */
readres      READ(readargs);         /*          proc=6  */
attrstat     WRITE(writeargs);       /*          proc=8  */
diropres     CREATE(createargs);     /*          proc=9  */
stat         REMOVE(diropargs);      */         proc=10  */
stat         RENAME(renameargs);           /*   proc=11  */
stat         LINK(linkargs);               /*   proc=12  */
stat         SYMLINK(symlinkargs);         /*   proc=13  */
diropres     MKDIR(createargs);      /*          proc=14 */
stat         RMDIR(diropargs);       /*          proc=15 */
readdirres   READDIR(readdirargs);         /*   proc=16  */
statfsres    STATFS(fhandle);        /*          proc=17 */
```

The NFSv3 protocol specifies 21 procedures exported by an NFS server. Most of these procedures have identical semantics as those in version 2, however because file attributes are now returned after most operations and some fields are now larger, the exact types of the arguments and results are slightly different.

common network file system protocols, the Preferred Embodiment being just one example, instance or application of this invention. The following paragraph describes the similarity between NFS and another popular network file system protocol, Microsoft's Server Message Block (SMB).

The SMB protocol is currently being revised as the Common Internet File System (CIFS), which is likely to become a significant standard protocol over the next few years.

Microsoft's Server Message Block (SMB) is the file sharing protocol used by MS-Net, LAN Manager and Windows Networking. This protocol is the native file-sharing protocol of Microsoft Windows 9x, Windows NT and OS/2 operating systems. Instead of the SUN XDR and RPC layers used in layers 2 and 3 of the NFS protocol stack, SMB used NetBIOS as its middle layer. NetBIOS started as a high-level programming language interface to IBM PC-Network broadband LANs, but has evolved as a "wire-protocol" over several underlying transport mechanisms including Token-ring, TCP/IP, IPX/SPX. The currently preferred transport is TCP/IP, and UDP/IP (as described in Internet RFCs 1001 and 1002) making layer 1 identical between NFS and SMB. Instead of contacting a portmap daemon, SMB broadcasts requests to NetBIOS name server (such as Microsoft WINS) to locate remote file servers. Much like a portmap daemon the name server replies the IP address of the server supporting the named file system. An SMB client then contacts the file services on this host using the NetBIOS session manager and creates a session connection much like NFS over TCP/IP after contacting a MOUNT daemon. Packets are then sent and received using TCP/IP identically to NFS in all but the format of the messages sent between machines. By correctly interpreting and replying to these messages, a virtual file server may provide a virtual SMB file system to Windows-based PCs on a network.

(13) Biological Sequence Database Management

Bearing the foregoing framework in mind, it is widely recognized that the efficient storage of protein and nucleic acid sequence databases is one of the major challenges in bioinformatics. The problems stem from the interactions of

```
                        /* NFS version 3 protocol API */
GETATTR3res        GETATTR(GETATTR3args);                  /* proc=1  */
SETATTR3res        SETATTR(SETATTR3args);                  /* proc=2  */
LOOKUP3res         LOOKUP(LOOKUP3args);                    /* proc=3  */
ACCESS3res         ACCESS(ACCESS3args);                    /* proc=4  */
READLINK3res       READLINK(READLINK3args);                /* proc=5  */
READ3res           READ(READ3args);                        /* proc=6  */
WRITE3res          WRITE(WRITE3args);                      /* proc=7  */
CREATE3res         CREATE(CREATE3args);                    /* proc=8  */
MKDIR3res          MKDIR(MKDIR3args);                      /* proc=9  */
SYMLINK3res        SYMLINK(SYMLINK3args);                  /* proc=10 */
MKNOD3res          MKNOD(MKNOD3args);                      /* proc=11 */
REMOVE3res         REMOVE(REMOVE3args);                    /* proc=12 */
RMDIR3res          RMDIR(RMDIR3args);                      /* proc=13 */
RENAME3res         RENAME(RESNAMEargs);                    /* proc=14 */
LINK3res           LINK(LINK3args);                        /* proc=15 */
READDIR3res        READDIR(READDIR3args);                  /* proc=16 */
READDIRPLUS3res    READDIRPLUS(READDIRPLUS3args);          /* proc=17 */
FSSTAT3res         FSSTAT(FSSTAT3args);                    /* proc=18 */
FSINFO3res         FSINFO(FSINFO3args);                    /* proc=19 */
PATHCONF3res       PATHCONF(PATHCONF3args);                /* proc=20 */
COMMIT3res         COMMIT3args);                           /* proc=21 */
```

(12) Other Remote File System Protocols

The detailed overview of the NFS protocol given above provides a background for the "Preferred Embodiment" of the present invention. However, the virtual network file server invention may easily be extended to cover other four issues; database size, data formatting, data subsetting and data integrity.

The most apparent issue is that of the very large size of current databases. Current database sizes are in the ranges of tens to hundreds of gigabytes of data for representing several million nucleic acid and several hundred thousand protein sequences. This problem is compounded by the current rate of growth of these databases, which have a doubling time of about 18 months. Indeed, with scientists entering the final stages of the human genome project, this rate is expected to increase rather than decrease in the near future. The next issue is that of data representation.

Most bioinformatics sites maintain a number of database searching software, including programs such as Blast, FASTA and GCG. Unfortunately, this diversity results in most bioinformatics sites maintaining major databases in multiple file formats such as the original flat files, FASTA format, GCG/PIR format, Blast compressed format and indices, and SRS indices. Each additional representation typically requires tens of gigabytes additional file storage for its databases. The next issue is that of database sub- and super-setting. In addition to each static database, bioinformatics sites often maintain composite databases (or supersets), such as all protein sequences (protein= swissprot+genpept+pir+pdb or swissprot=swissmain+ swissnew) and all nucleic acid sequences (nucleic=embl+ genbank).

Some forms of supersetting can be handled by database searching software treating multiple databases as a compound virtual database. However, this has much poorer performance than pre-defined non-redundant databases that eliminate the duplicate entries between databases. Similarly, very few packages can perform sensible data subsetting, hence most sites also independently maintain subset databases such as all yeast sequences, all human EST sequences, all protein kinases, etc. Finally, the guaranteed availability of frequently updated sequence databases is considered essential to some organizations. These sites, therefore maintain duplicate databases, allowing one to be updated and modified while providing regular services with the other. In this way, should an automated update fail or a database format or organization change, the "live" database is not corrupted.

The constraints mean that most competitive bioinformatics sites require hundreds of gigabytes of high availability storage. Indeed these demands are so great that many sites (including most academic sites) are reduced to accessing bioinformatics resources across the internet, even with the potential disclosure issues.

SUMMARY OF THE INVENTION

The present invention is specifically designed to address and alleviate the above-identified deficiencies in the art. In this regard, the present invention is directed to a virtual file server that, by using standard protocol means, provides an efficient method of managing databases that require far less disk space (i.e., memory), and that further provides for a novel method of delivering computational data. The present invention is particularly well suited to address the aforementioned problems of biological sequence database management.

The virtual file server essentially comprises a process by which the contents of a file from a remote file system can be generated and returned in response to a file system request.

The virtual file server is designed to simulate a remote file system, providing "virtual" files and directories to a machine making a request on a local area network via the network interface. In this regard, the virtual network file system operates to receive and reply to file system requests from the network as though such virtual network file systems were retrieving and storing files on a physical storage media (i.e., hard disk). In operation, once the virtual network file server receives a file read request, for example, the virtual network file server generates the contents of a specified "virtual" file, the contents of which may either be generated algorithmically from its file name and environment, or by transforming a stored physical file by encryption, decompression, and the like.

To client applications, the virtual file server appears as a normal directory hierarchy containing the appropriate files in the appropriate formats. Advantageously, the virtual network file server does not involve the client operating system, but uses its native mechanisms to access a remote machine. Moreover, by using a standard protocol such as NFS or SMB, the virtual file server does not require that specialized network software be written for the clients and will thus allow existing software to work with the virtual file server without modification. For example, NFS client software is distributed with UNIX and is available for virtually every operating system including Microsoft Windows, Apple Macintosh and VAX/VMS. Similarly, Microsoft SMB clients are included in Microsoft Windows NT, Windows 95 and Windows 98.

From the data management perspective, the virtual file server is able to maintain the subject databases internally in a single format. Upon file requests, the virtual file server is able to perform sub- and supersetting operations and then the appropriate reformatting. Because only one format of the database is being maintained, caching on the server is far more effective. Many sequence database format conversions may be implemented very efficiently (for example, using finite state machines) resulting in negligible performance loss. Indeed, the server is free to internally represent the database in a very efficient compressed format, for example, removing duplicate sequences, Huffman or bit-wise encoding of residues, and representing sequences that are subsequences of another as a reference to the location within the parent.

Another potential application is that individual sequence database entries can be exported as individual sequence files. This allows query sequences to be specified to bioinformatics algorithms without extracting ("fetching") them from the database first.

The virtual file server architecture is also applicable to storage management of structural databases and integration of external computational chemistry applications. One major application is in the storage and maintenance of the Brookhaven Protein Databank, PDB (and also the Rutgers University nucleic acid structure database NDB). Currently this "database" is maintained as a collection of approximately 7000 files stored as ASCII text files. These data files can be represented internally much more efficiently, both through compression and reducing redundancy in representation.

Finally, the virtual file server provides a convenient mechanism for providing computational chemistry services. For example, the virtual file server could perform file format conversion by exporting Sybyl Mol2, XPLOR PDB and other file formats. Computationally, the server could also provide DSSP or Stride secondary structure assignments in each PDB file, reconstruct backbone and/or sidechain coordinates from alpha carbon only files, generate crystallographic symmetries, select representative NMR models or perform property calculations.

BRIEF DESCRIPTION OF THE DRAWINGS

These, as well as other features of the present invention will become more apparent upon reference to the drawings wherein.

DETAILED DESCRIPTION OF THE INVENTION

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is to be understood, however, that the same or equivalent functions and sequences may be accomplished by different embodiments and that they are also intended to be encompassed within the scope of this invention.

The present invention is directed to a virtual network file server that, in response to a request to a computer's operating system involving a remote file system, generates the contents of a specified file and returns the same to the computer from which the request was made via the network interface between the computer from which the request was made and the server machine receiving such request. In this regard, in practice the server machine receiving such request, via its operating system, passes such request onto the virtual network file server, the latter running as a user process.

Figure 1:
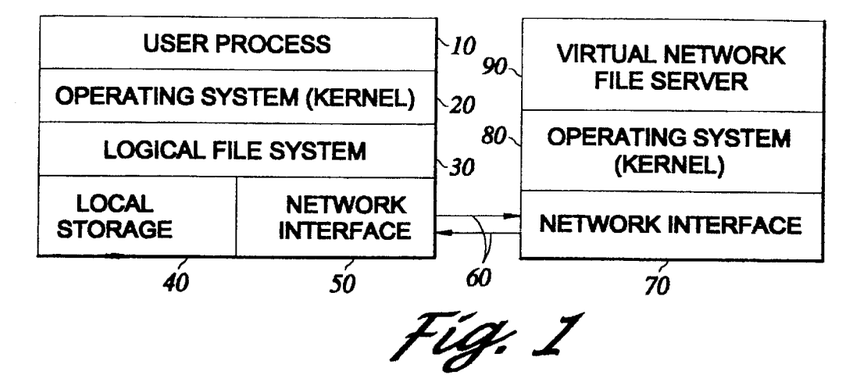
FIG. 1 is a block diagram of the communication format for accessing a logical file or directory, the latter being located on a local physical storage media or on a remote machine.

As seen in FIG. 1, a user application or process 10 running on a computer makes a request to the operating system 20 on that machine to access a logical file system or directory 30. The logical filename (and directory) specified in the request is interpreted by the operating system's file services as belonging to a remote file system, rather than being stored on a local storage device 40. The operating system 20 then uses its conventional remote file system mapping to determine the location on the network of the file server for requested file. The operating system 20 then generates a TCP/IP request to the network file server via the network file server's network interface 50. The network file server may be on the same machine, where the network interface simply copies the request packet to the server process, or on a remote machine, where the network interface 50 transmits the request packet over a local area network 60. The server machine receives the packet via its network interface 70, and the operating system 80 passes the request on to a virtual network file server 90 running as a user process.

The virtual network file server 90 emulates a file system, providing "virtual" files and directories to the machines on the local network. On receiving a file read request, it generates the contents of a specified "virtual" file. The file contents may either be generated algorithmically from its filename and environment or by transforming a stored physical file by encryption, decompression or non-trivial translation. The distinction is made between trivial and non-trivial translation. A number of existing file servers may be configured to translate line termination characters before exporting files to a remote machine. The mechanisms described here apply to translation of data into different formats, such as images between image file formats or bioinformatics databases between common representations. Such translation capabilities may further advantageously be utilized to rapidly convert text files existing in one particular word processing format or program to another type of word processing format. Similarly, such translation properties can enable rapid conversion from one encrypted file to another, as well as data stored in one particular type of compressed format to another. In this regard, once the contents of the virtual file have been generated, the same can be sent as a reply packet back across the network to the requesting user process.

All prior art on virtual file systems has required modification of the client operating system 20, such that files are transformed by the logical file system 30 on the local host. See, for example, the teachings of U.S. Pat. No. 5,584,023 to Hsu entitled Computer System Including a Transparent and Secure File Translation Mechanism. One major distinction is that the virtual network file system of the present invention does not involve the client operating system, but uses its native mechanisms to access a remote machine. Instead, the virtual network file system receives and replies to file system requests from the network as though it were retrieving and storing files on a physical storage media.

Figure 2:
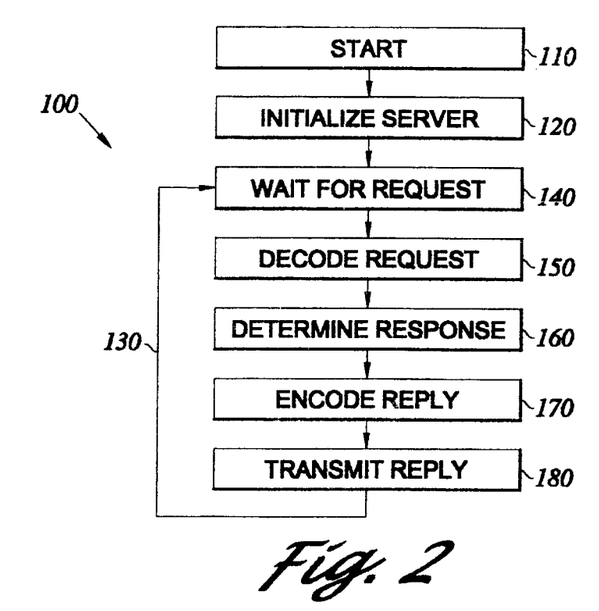
FIG. 2 is a flow chart of a continual loop program by which the virtual network file server processes and returns file system requests for remote file systems.

The server process 100, once started 110 on a machine, initializes the server 120 and enters a continual loop 130 waiting for file system requests 140 directed to remote machines or systems, decoding the requests 150, determining the response 160, namely, generating the requested data or performing the requested action, encoding the reply 170 and then transmitting 180 (i.e., returning) the results to requesting process, as depicted in FIG. 2. The "decode request" 150 and "encode reply" 170 steps perform the mapping of the native file system requests into and from, respectively, the internal data structures and routines used by the virtual network file server. This allows the virtual file server to support multiple remote file system protocols including UNIX NFS, Microsoft LanManager, AppleShare, etc.

Principally, the current implementation makes use of multiple threads (or processes) allowing multiple file system requests to be implemented concurrently, and for the virtual server to perform processing to keep the contents of virtual file systems up to date without receiving a file system request.

Figure 3:
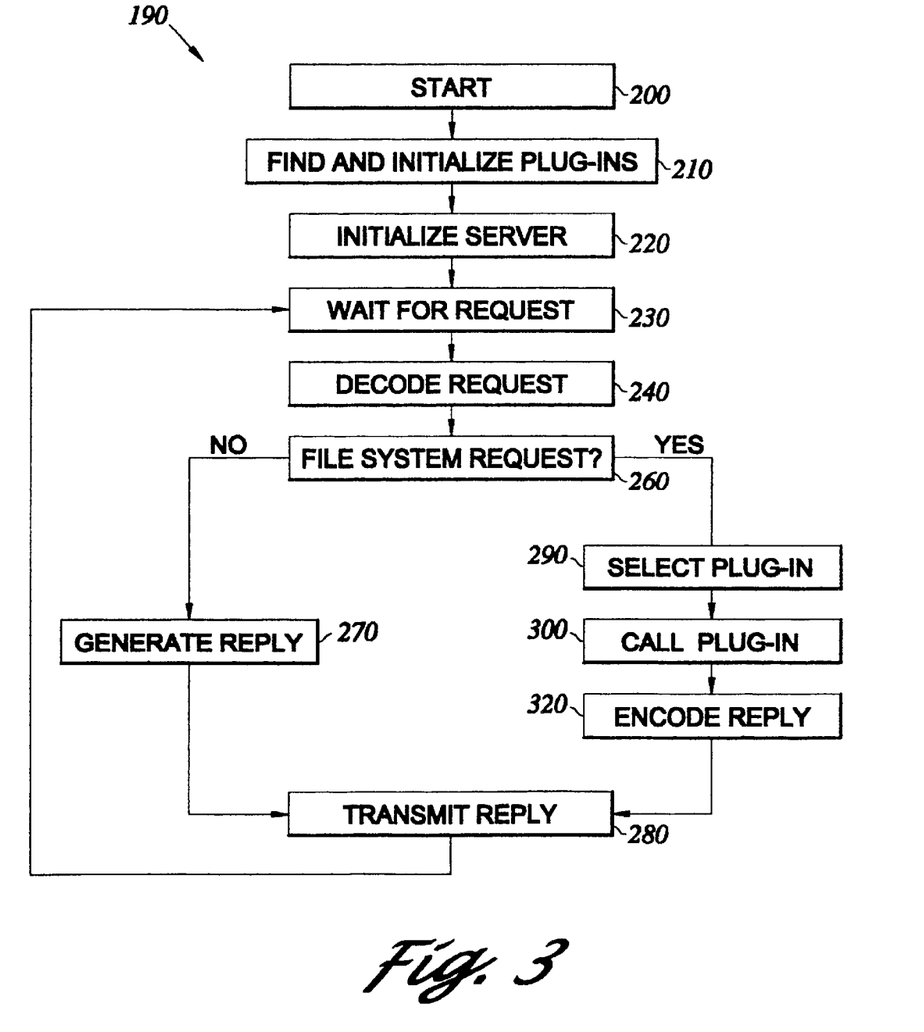
FIG. 3 illustrates the flow chart of FIG. 2 wherein such program further provides for an isolation of the virtual file system of the present invention from the virtual network file server itself.

One variant 190 of the previous flow chart, as depicted in FIG. 3, is the implementation where the contents and behavior of the virtual file system is isolated from the virtual network file server itself. In this way, the virtual network file server of the present invention allows multiple uses (or implementations) to be determined at run-time. This is achieved using dynamic shared object technology, often referred to as plug-ins. These plug-ins typically take the form of shared libraries on UNIX machines, DLLs under Microsoft Windows, and CodeFragments on the Apple Macintosh. When the server first starts up 200, it locates and dynamically links in virtual file system "plug-ins" 210. The plug-ins represent and encode the user-defined behavior of the virtual file system. To the client machine, these plug-ins form independent files or directories on the remote file system, as conceptually illustrated in FIG. 4.

Each time a request is received, the network file server initializes 220 and determines which of the loaded plug-ins should handle the request and dispatches, decodes and waits for the request appropriately as per steps 230, 240. To the extent such request is not directed to the file system 260, the server then generates a reply 270 and converts the resulting data into the native format of the requesting system and transmits 280 it back to the requesting machine. However, the virtual network file server is also advantageously able to handle such file system "housekeeping" requests 260 by selectively choosing 290 and calling 300 a plug-in and thereafter encoding a reply 320 therefrom, thus freeing other plug-ins of the task of implementing trivial or common functionality. In this way, the virtual network file server hides the complexities of the remote file system encoding and decoding from the plug-in, and also simplifies its operation.

Figure 4:
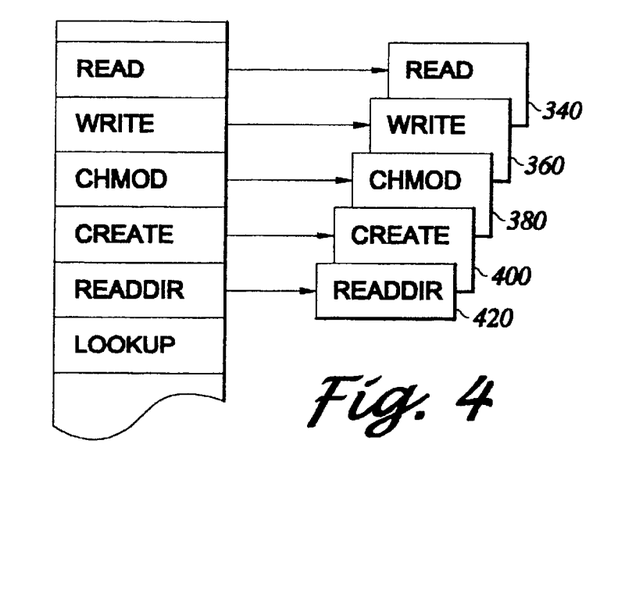
FIG. 4 is a diagram of specified requests converted by the server of the present invention to independent files or directories that are forwarded by the network file server to process remote file system requests.

The behavior of each virtual file system plug-in is then to handle a simplified set of remote file system requests, shown conceptually in FIG. 4. Such requests include reading data from a file (READ) 340, writing data to a file (WRITE) 360, changing the security protection and permission on a file (CHMOD) 380, creating a new file (CREATE) 400, and determining the contents of a directory or folder (READDIR) 420. For each plug-in, the virtual network file server maintains a table of the routines within that plug-in for each remote file system request. Once the virtual network file server has decoded a request and determined which of the plug-ins need respond to it, it looks up the required function within the appropriate plug-in's "function dispatch" table and then calls that function.

In this way, the precise behavior of the file system need not be specified at the time the virtual network file server is designed or implemented. However, the use of virtual network file servers and implementations that provide nontrivial transformations, such as database translations or computations are novel, practical and of commercial benefit.

Figure 5:
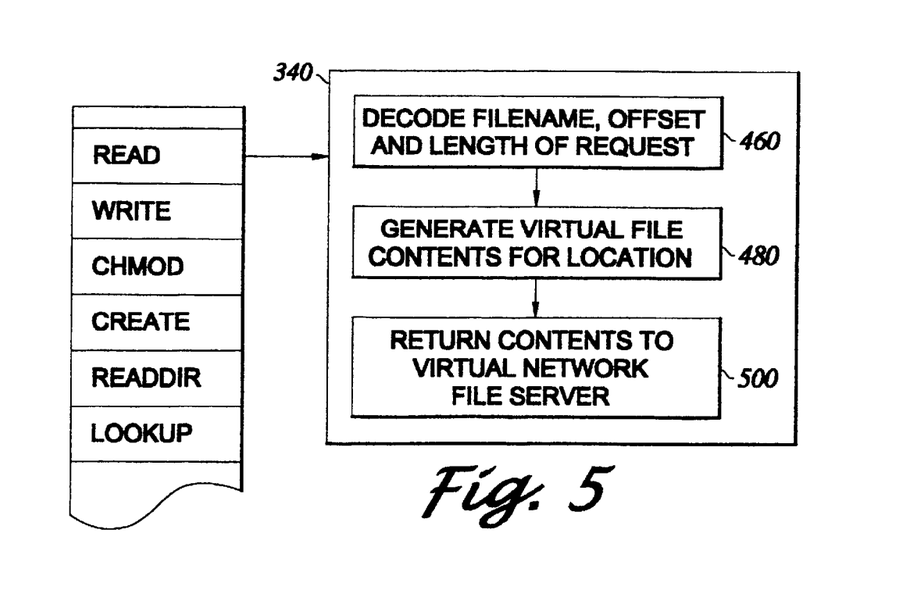
FIG. 5 depicts a flow chart for the READ function of a virtual file system "plug-in" for generating and returning the contents of a virtual file to the virtual network file server.

To expand upon the tasks required of a virtual file system plug-in, FIG. 5 represents the simplified flow chart for the READ function 340, to decode the file name 460, generate virtual file contents 480, and return the contents of a virtual file 500. The plug-in's read function is called with a file identifier, a location within the file and the amount of the data to be read 460. The plug-in is then free to choose what the contents of that file should be 480, potentially based upon the start of the server, the user and/or machine requesting the data or other factors. For example, the plug-in could state that the contents of the requested file "date.txt" is always the current time and date, i.e. "Wed Aug 12 11:28:43 MDT 1998". Note that reading the contents of the same file on the following day or just several seconds later would produce different results and that the contents of the file never exist on physical storage media but are generated algorithmically from the host CPU's clock. Continuing the example, if the network read request passed to the plug-in requested the fifth, sixth and seventh characters of the file, the plug-in would return "Aug". This data is then passed back to the network file server 500 which performs the tasks of encoding the data back into a packet that emulates the reply from a real remote file server.

(1) Executing the Virtual NFS Server

The virtual file server prototype currently implements both versions 2 and 3 of the NFS protocol and versions 1 and 3 of the MOUNT protocol over the UDP/IP transport protocol. This implementation, described below, is the presently preferred embodiment of the virtual file server, but does not in any way restrict the scope of the invention to the NFS protocol or the UNIX operating system. As such, the example "embodiment" is referred to as a virtual NFS server or "vnfsd" in the following sections, which describe the UNIX version of "vnfsd."

The virtual NFS server (vnfsd) may be started from the UNIX command line, by simply typing "vnfsd". The server does not require super-user privileges to run, and hence need not be started by "root".

The "vnfsd" also accepts the following optional command line arguments:

1.) -port <n>Use the specified port, instead of the default port 21069.

2.) -daemon Execute as a daemon in background and detach from parent process.

3.) -debug Display debugging information to stdout for each RPC request packet.

4.) -noreg Do not attempt to register server with the RPC portmapper daemon.

A common practice is to start the vnfsd automatically when the machine is rebooted by adding the vnfsd command to the networking section of the system "/etc/rc.*" scripts. The only requirement is that "vnfsd" be started after the conventional mount and NFS daemons have been started.

(2) Terminating the Virtual NFS Server

Currently the only way to halt the vnfsd daemon is to send it the SIGINT interrupt signal. If the program is running in the foreground, this may be done by typing "^C" (or similar process control character) from the controlling UNIX shell. If the program is running as a daemon, it may be halted using the command "kill -INT <pid>" where pid is the process id of the running daemon.

Any clients currently mounting the file system should unmount the appropriate directories before stopping the server, otherwise the client machines may hang when next accessing the vnfs file system. If the mount command specified "soft," the client processes will time out after several seconds, but system performance may be seriously degraded.

The virtual NFS daemon should not be killed, but only interrupted. The daemon catches the interrupt signal and closes down, gracefully closing and flushing any appropriate files and unregistering itself from the RPC portmap daemon.

(3) Mounting the Virtual NFS File System

Ideally, a UNIX client then mounts the virtual file system with the command: mount -t nfs -o port=21069 , mountport= 21069 server:/ /vnfs This command instructs the local kernel to mount an NFS directory from the remote machine "server" onto the local mount point "/vnfs". When the mountport option is specified the remote exported file is not interpreted by the server, the root directory in the example above. The local mount point, /vnfs, must be an existing directory on a local file system. Additionally, it is best to also include the "soft" mount option, allowing the client to timeout NFS requests rather than hang the machine, should the remote vnfs daemon fail.

Unfortunately, very few operating systems currently support the "mountport" option to their mount commands. In such a case, the appropriate UNIX command would look like: mount -t nfs -o port=21069 , soft server:/vnfs /vnfs.

The reason for the different directory path on the remote server is that without the mountport option, the MOUNT protocol request goes to the conventional mount on the remote "server". The vendor supplied mount then checks the export list in "/etc/exports" for valid mount point. If the server is currently exporting file systems, then any of those paths will suffice. The better solution demonstrated above is to simply create an empty directory "/vnfs" on the remote machine [the vnfsd mount point] and add this to the "/etc/exports" file.

Alternatively, an entry may be added to the "/etc/fstab" file on the client machine specifying the server, remote directory and mount options for the local nfs. A typical fstab entry for the vnfs daemon would look like:
server:/vnfs /vnfs nfs port=21069 , soft, noauto 0 0.

If the "noauto" option is specified as shown above, the virtual NFS server is not automatically mounted when the client is booted. Once this line is inserted into /etc/fstab, the vnfs daemon may be manually mounted with the much simpler command mount /vnfs.

(4) Unmounting the Virtual NFS File System

Once the client machine has finished accessing the virtual NFS server, the /vnfs directory may be unmounted from the client file system using the UNIX command: umount /vnfs.

All processes should have closed any open files on the virtual file system and no process should have any subdirectory of the mount point as a current working directory. If the file system is currently in use, the umount command will fail. If client machines do not successfully unmount the filesystem before the server is terminated, they run the risk of hanging waiting for a response when they next try to access the virtual file system.

(5) Interaction with the RPC Portmapper Daemon

The first task performed by the vnfsd daemon is to contact the portmap daemon on the local machine to determine whether it is currently running conventional NFS and mount daemons. By default, if the portmap daemon indicates that neither of these is not currently running, it registers itself with the portmap daemon as the real nfs and mount daemons on the local machine.

As the server terminates, it contacts the portmap daemon once again to determine if it is still the registered NFS and MOUNT daemon on the system. If so, it unregisters itself so that other programs are aware that NFS and MOUNT services are no longer provided by the server machine.

This interaction with the RPC portmapper may be turned off using the "-noreg" command line option when the server is first started. This should slightly improve the startup and shutdown performance when it is known in advance that conventional NFS is running on the server machine.

Because there may be a conventional MOUNT daemon running on the local machine and the client "mount(1)" command may not support the "mountport" option, the first request from client may be an NFS request with a "foreign" file handle. The virtual NFS daemon supports this operational mode by treating any unrecognized file handle as the root file handle of the system.

(6) Generic Virtual File System Applications

There are also a number of generic applications for the virtual file system architecture. These include compression, deferred deletion, revision control and NFSWeb, described herebelow:

(a) The "Makefile" File System

One interesting variation of the virtual file system architecture is the Makefile file system. The UNIX make(1) utility is a program development tool that simplifies the task of compiling and linking large applications. The "make" program stores the list of commands necessary to create an application and the dependencies (or ordering information) in a Makefile. This universally accepted mechanism for specifying how files are generated by application can be used to integrate arbitrary external programs into the virtual file server. Each directory of the Makefile file system contains a Makefile that informs the virtual NFS daemon which files are exported and which programs to execute to generate their contents.

(b) Compressed File Systems

Although popular on most personal computer systems due to economic constraints, automatic disk compression and decompression software is rare on UNIX and VMS systems. The much larger disks and faster processors of current workstations should in theory multiply the benefits of compression and de-compression on the fly. Indeed, PC systems software such as "Stacker" and "DoubleSpace" demonstrate increased performance as cost of compression and decompression is less than reduction in file I/O. It is therefore further contemplated that the present invention may be adapted to provide a "zlib", "gzip" or "bzip" based file system.

(c) Deferred Deletion

A file system need not delete or remove a file from the server at the time a client issues a "rm" or "del" command. Instead, it could temporarily move the file to a "trash" or "recycle" area until it is automatically deleted after a suitable period elapses. This allows common user mistakes to be corrected by recovering the files from the "trash". Such trash areas may be stored compressed and automatically garbage collected when the disk's free space drops below a certain threshold.

(d) Revision Control

File Systems are often used to store multiple revisions or versions of a particular file. Much like the generation number is appended to file names in the VMS file system. If the file system knows that a set of files have similar contents or are modifications of an existing file, the virtual network file server is able to maintain the differences (or edits) between files, rather than their entire contents. This avoids the large disk space requirements for maintaining previous versions of regularly modified documents.

(e) NFSWeb

Unlike the proposed WebNFS protocol that allows WWW clients to access NFS servers over a modified NFS protocol, NFSWeb could allow WWW pages to be accessed via files on the local file system. Much like the Andrew File system (AFS), access to a file such as "/http/www. microsoft.com/index.htm" would result in the appropriate HTTP request and the returned contents exported as the file contents.

(7) Example Implementation Functional Details

As will be recognized by those skilled in the art, the virtual file server described above essentially allows developers to implement virtual file systems as shared libraries, which are linked by the vnfsd daemon at run-time. The vnfsd server takes care of all the low-level TCP/IP-based sockets, connection management and Sun Microsystems' XDR, RPC, MOUNT and NFS wire protocols. This file system library need only implement a much simpler functional API of approximately twelve subroutine entry points. Many of these subroutines are optional depending upon the type of file system. This allows single-file read-only file systems to be implemented using a minimum of two functions, and multiple-file read-only file systems using a minimum of nine.

As mentioned in the previous paragraph, there are two types of file systems. These are single-file file systems, that describe only a single file, and multiple-file file systems that describe an arbitrary number of files and subdirectories. The principal distinction between the two is that the root inode, the zero-inode, is a regular file for the former and the directory for the latter. The single-file file system is a simplification of the virtual NFS API that allows a plug-in to be defined by only two subroutines, but must use pluginfs dynamic linking and cannot be linked statically to the vnfsd server.

The virtual file system developer simply writes implementations of these required subroutines that describe the contents of the file system. If all subroutines are implemented, the file system object may either be statically linked into the vnfsd directly or linked at run-time as dynamic shared objects by the provided "pluginfs" file system. If not all of the functions are implemented, the pluginfs must be used and will provide default implementations for the missing entry points. In a production environment, dynamically linked pluginfs solution is preferred but statically linking is useful for development and debugging.

The pluginfs requires that shared libraries have a name of the form "*fs.so" and be placed in the vnfsd plug-ins directory.

(8) API Functional Overview

The twelve functions that currently define a virtual network file system are listed below. Before each function prototype is a key indicating whether an implementation is required or is applicable for a particular type of file system.

'D' indicates that the function is required for a multiple-file file system.

'd' indicates the function is applicable to multiple-file file systems.

'F' indicates that the function is required for a single-file file system.
'f' indicates that the function is applicable to single-file file systems.

| | |
|---|---|
| df | char* mxINodeInitialize( void ); |
| Df | int mxINodeIsValid ( long inode ); |
| Df | int mxINodeType ( long inode ); |
| DF | unsigned long mxINodeFileLen ( long inode ); |
| DF | int mxINodeFileData ( long inode, unsigned char *ptr, unsigned long off, int len ); |
| D | long mxINodeDirEntry ( long inode, unsigned char *ptr, int len ); |
| d | int mxINodeDirSubdirs ( long inode ); |
| D | int mxINodeDirNext ( long inode, int cookie ); |
| D | int mxINodeDirName ( long inode, int cookie, unsigned char *ptr ); |
| D | int mxINodeDirNameLen ( long inode, int cookie ); |
| D | long mxINodeDirINode ( long inode, int cookie ); |
| df | void mxINodeCleanUp ( void ); |

As can be seen from the above list, single-file file systems typically require between 2 and 6 functions to be implemented, and multiple-file file systems typically require between 9 and 12. When the file system plug-in is loaded, it is initialized (if mxINodeInitialize exists) and then mxINodeType is called to determine the type of the file system. If mxINodeType does not exist, the file system is assumed to be single-file. The plug-in manager then checks that all of the required functions are present. If not, the mxINodeCleanUp function is called (if it exists) and the module unloaded.

The virtual file system API makes use of the concepts of an inode and a directory cookie. An inode is a 32 bit signed long, that is used to distinguish every file and directory on the file system. Only the lower 28 bits are significant allowing any single file system to export a maximum of 268 million individually named files or subdirectories. Multiple-file file systems must map inode 0 as the root directory of the file system and single-file file systems must map inode 0 as the virtual file. Inodes need not be uniquely named within a file system. This allows several files (or directories) to have identical contents.

A directory cookie is a 32 bit signed integer that conceptually represents a logical position in a list of directory entries. A directory cookie need only be unique to its own directory. The zero-cookie has special significance representing either the position before the first directory entry or the position after the last entry. The zero-cookie is only ever passed to or returned from the "mxINodeDirNext" function. The pluginfs and UNIX operating system place additional constraints upon directory cookies. By convention, cookie 1 must have local name "." and represent the current directory, and cookie 2 must have local name ". ." the parent of the current directory [or the root directory when the current directory is the root directory]. Note that cookies need not be sequential and may be returned by "mxINodeDirNext" in any order until the zero-cookie.

(9) Server Start-up and Shutdown Functions

The virtual NFS API contains a single initialization and a single clean-up function. Both of the functions are optional in both types of virtual file system.

mxINodeInitialize
char* mxINodeInitialize( void );

The mxINodeInitialize function is used to allow the plug-in to initialize any required data structures to their initial state. This optional routine has no arguments and returns a null-terminated C string. This string is used to name the file system. This name is ignored when linking statically, but is used as the directory name that contains the file system when using the plug-in filesystem. Conventionally, these names are the prefix of the system library name prior to the "fs.so" suffix. For example, the demonstration file system in "demofs.so" returns the string "demo". This function is only ever called once, before any of the other functions, when the vnfsd server is first started-up.

mxINodeCleanUp
void mxINodeCleanUp( void );

The mxINodeCleanUp function is used to allow the plug-in to deallocate any allocated memory or system resources before the vnfsd server terminates. This function takes no arguments and returns no results. This function is only ever called once, and none of the other functions are ever called again afterwards.

(10) General Functions

The virtual NFS API contains two functions that are independent of the file system types of their inode arguments. Hence these functions have inode arguments that may be either files or directories.

mxINodeIsValid
int mxINodeIsValid( long inode );

This function is used to check the validity of an inode value. It takes a signal long as an argument denoting the inode, and returns a non-zero integer if the inode is valid within the file system and a zero otherwise. This return value uses the conventional encoding of Boolean values in the C programming language. The zero-inode must always be valid. It should be safe to assume that no other function will be called with an inode that is flagged as invalid by this function.

This function must be implemented for multiple-file systems. For single-file file systems, the default behavior is that the zero-inode is the only valid inode.

mxINodeType
int mxINodeType( long inode );

This function is used to determine the "type" of a file system inode. It takes a signed long as an argument denoting the inode, and returns one of three integer values defined as macros in the "filesys.h" include file. These values are MX INODETYPE_FILE for inodes that are regular files, MX_INODE_DIRECTORY for inodes that are directories and MX_INODE_NOTFOUND should the inode be invalid.

This function must be implemented for multiple-file file systems, when the zero-inode must always return MX—INODE_DIRECTORY. If implemented for single-file file systems, the default (and required) implementation is to return MX_INODE_FILE for the zero-inode.

(11) File Functions

The virtual NFS API contains two functions for accessing regular files within a virtual file system. Hence these functions have inode arguments that must be files.

mxINodeFileLen
unsigned long mxINodeFileLen( long inode );

The mxINodeFileLen function is used to determine the length of a file. This function has a single long argument representing the file inode and returns an unsigned long denoting the length of the file in bytes. This restriction currently limits each virtual file to a maximum size of 4 Gbytes. Inodes that are determined to be invalid or directories should return a value of zero. It must be possible to read all of the specified bits of the file with the mxINodeFileData function. If mxINodeFileLen returns a value larger than can be read by mxINodeFileData, most clients will loop continually attempting to read past the end of the virtual file.

This function must be implemented for both types of file systems.

mxINodeFileData
int mxINodeFileData( long inode, unsigned char *ptr, unsigned long off, int len );

The mxINodeFileData function is used to retrieve the contents of a regular file. This function takes four arguments; a long representing the file inode, a pointer to buffer of unsigned characters to receive the data, an unsigned long representing the offset within the file from which to read an integer representing the number of bytes to read. This function returns an integer, which is the number of bytes actually placed in the buffer. Should the inode be invalid or a directory, the function should return zero and leave the buffer unmodified. Similarly, if the offset is greater than or equal to the file length, the function should return zero and leave the buffer unmodified. The function should never fill the buffer with more than the requested number of bytes. The function should never place more characters in the buffer than are remaining in the file, i.e., if the return value is greater than zero, this value plus the file offset is less than the file length.

This function must be implemented for both types of file systems.

(12) Directory Functions

The virtual NFS API contains six functions for accessing directories (or folders) within a virtual file system. Hence these functions have inode arguments that must be directories. Four of these functions also have directory cookie arguments. These functions are used for traversing the contents of a directory.

mxINodeDirEntry long mxINodeDirEntry( long inode, unsigned char *ptr, int len );

The mxINodeDirEntry function is used to locate a directory entry by name. The function takes three arguments; a long representing the directory inode, a pointer to a string of characters holding the filename and integer holding the length of the filename argument. The function returns a long, which denotes either the inode of the located directory entry (file or subdirectory) or the value MX_INODE_INVALID. The value MX_INODE_INVALID should be returned if the inode argument is not a valid directory inode or if the filename is not found. The filename parameter is not (may not) be a null terminated string and the implementation should never inspect more than the specified number of bytes. All implementations must recognize the directory entries "." and ".." returning the argument inode or the inode of its parent respectively. Implementations are allowed to recognize "hidden" filenames that do not correspond to directory cookies.

This function is required for multiple-file file systems.

mxINodeDirSubdirs int mxINodeDirSubdirs( long inode );

The mxINodeDirSubdirs function issued to efficiently determine the number of subdirectories in a directory. The function takes a single long argument holding the directory inode to be inspected and returns an integer containing the number of subdirectory entries. If the argument is not a valid directory inode, or the implementation does not wish to report the number of subdirectories, it should return the value zero.

This function is optional and only called for multiple-file file systems. If this function is not implemented by the plug-in the default behavior is always return zero.

mxINodeDirNext int mxINodeDirNext( long inode, int cookie );

The mxINodeDirNext function is used to traverse the contents of a directory. This function takes two arguments, a long holding the directory inode and an integer holding the current directory cookie, and returns an integer representing the next cookie in sequence. If the inode argument is not a valid directory inode the function should return the value zero. The vnfsd server starts the sequence by calling this function with the zero-cookie. This function is called repeatedly with the returned cookie until the function returns a zero-cookie indicating the end of the sequence. This function should only ever be called with either a zero-cookie, or a cookie returned by a previous call with the same directory inode. However (due to protocol concurrently), a non-zero cookie can never be guaranteed to be the result of the previous call to this function. This function should return the value zero, if presented with an unrecognized cookie value for the specified directory.

An implementation is free to choose its own internal representation of cookies. The sequence need not be continuous or monotonic, but the same value must not be visited twice in a sequence. The cookie sequence should also include the value 1 (representing the current directory ".") and the value 2 (representing the parent directory ".."), but these values may appear at any position in the sequence.

This function is required for multiple-file file systems.

mxINodeDirName int mxINodeDirName( long inode, int cookie, unsigned char *ptr.

The mxINodeDirName function is used to find out the name of a directory entry found during a directory traversal. This function takes three arguments, a long holding the directory inode, an integer holding a directory cookie, and a pointer to a buffer for returning the file name. The function returns an integer containing the length of the filename (the number of bytes placed in the specified buffer). If the inode argument is not a valid directory, or the cookie is not a recognized cookie for the given directory, the function should return the value zero and leave the buffer unmodified. No more than 256 bytes should ever be written to the specified buffer, which limits the maximum size of a filename. The string is allowed to be null-terminated but the return value should not include the trailing zero byte. This routine should never be called with a zero-cookie.

For a valid directory inode, the cookie 1 should result in the first byte of the buffer being set to '.' and a return value of one, and the cookie 2 should result in the first two bytes of the buffer being set to ".." and the return value 2. This function is required for multiple-file file systems.

mxINodeDirNameLen int mxINodeDirNameLen( long inode, int cookie );

The mxINodeDirNameLen function is used to determine the length of a filename of a directory entry found during a directory traversal. This function is similar to mxINodeDirName but is used to determine the filename's length before retrieving it. This function takes two arguments, a long holding the directory inode and an integer holding a directory cookie and returns an integer containing the length of the filename. If the inode argument is not a valid directory, or the cookie is not a valid cookie of the given directory, the function should return the value zero. This function should return the same value as mxINodeDirName for the same inode and cookie arguments. This routine should never be called with a zero-cookie.

For a valid directory inode, the cookie value 1 should return the value 1 and the cookie value 2 should return the value 2. This function is required for multiple-file file systems.

mxINodeDirINode long mxINodeDirINode( long inode, int cookie );

The mxINodeDirInode function is used to find out the inode of a directory entry found during a directory traversal. This function takes two arguments, a long holding the directory inode and an integer holding a directory cookie and returns an integer containing the length of the filename. If the inode argument is not a valid directory, or the cookie is not a valid cookie for the given directory, the function should return the value MX_INODE_INVALID.

For a valid directory inode and the cookie value 1, this function should return the directory inode argument. For a zero-inode and the cookie value 2, this function should return zero. For a valid non-zero directory inode and the cookie value 2, this function should return the inode of this directory's parent. This function is required for multiple-file file systems.

There has thus been provided a virtual network file server having architecture which provides for an efficient database management capable of generating contents and forwarding the same in response to remote file systems requests. It will be recognized by those skilled in the art that these and other modifications and additions may be obvious and may be implemented to adapt the present invention for use in a variety of different applications, including but not limited to, computational chemistry and object database management. It should be recognized that the present invention should be defined as broadly as the prior art will permit, and in view of this specification if needed.

What is claimed is:

1. A process for emulating the behavior of a network file system in response to a remote file system request made by a computer operating system in a standard network file system protocol via a digital computer network, the process comprising the steps:

a) receiving said request via said network;
   b) decoding said request in a standard network file system protocol;
   c) generating content data, other than said file system, in response to said request, said content data comprising a virtual file; and
   d) transmitting via said network said virtual file in said standard network file system protocol, as a reply to said computer operating system.

2. The method of claim 1 wherein in step c), said content data of said virtual file is generated algorithmically.

3. The method of claim 1 wherein in step c), said content data of said virtual file is generated by decrypting a stored physical file.

4. The method of claim 1 wherein in step c), said content data of said virtual file is generated by decompressing a stored physical file.

5. The method of claim 1 wherein in steps b), c) and d), said standard protocol comprises NFS.

6. The method of claim 1 wherein in steps b), c) and d), said standard protocol comprises SMB.

7. The method of claim 1 wherein in steps b), c) and d), said standard protocol comprises CIFS.

8. The method of claim 1 wherein in steps b), c) and d), said standard protocol comprises Appleshare.

9. The method of claim 1 wherein in step a), said request comprises a read-file request; and wherein in step c), the content data of said virtual file responsive to said read-file request is generated by querying a database system.

10. The method of claim 9 wherein in step c), said database system is a relational database system.

11. The method of claim 9 wherein in step c), said database system is an object-oriented database system.

12. The method of claim 9 wherein in step a), said request comprises a file-write request; and wherein step c) further comprises the step of inserting data into a database system in response to said request.

13. The method of claim 12 wherein in step c), said database system is a relational database system.

14. The method of claim 12 wherein in step c), said database system is an object-oriented database system.

15. The method of claim 1 wherein in step a), said request comprises a read-file request; and wherein in step c), the contents of said virtual file generated in response to said request are generated by converting the file format of a stored physical file to a second file format.

16. The method of claim 15 wherein in step c), said file formats are word processing file formats.

17. The method of claim 15 wherein in step c), said file formats are database file formats.

18. The method of claim 15 wherein in step c), said file formats are image or graphics file formats.

19. The method of claim 15 wherein in step c), said file formats are molecular structure file formats.

20. The method of claim 15 wherein in step c), said file formats are bioinformatics sequence file formats.

21. The method of claim 15 wherein in step c), said file formats are bioinformatics database file formats.

22. The method of claim 15 wherein in step c), said file formats are binary executable file formats.

23. The method of claim 15 wherein in step a), said request comprises a file-write request; and wherein step c) further comprises translating said content data of said virtual file into a different format.

24. The method of claim 23 wherein in step c), the content data of said virtual file is translated from a first word processing file format to a second word processing file format.

25. The method of claim 23 wherein in step c), the content data of said virtual file is translated from a first database file format to a second database file format.

26. The method of claim 23 wherein in step c), the content data of said virtual file is translated from a first graphics file format to a second graphics file format.

27. The method of claim 23 wherein in step c), the content data of said virtual file is translated from a first molecular structure file format to a second molecular structure file format.

28. The method of claim 23 wherein in step c), the content data of said virtual file is translated from a first bioinformatics sequence file format to a second bioinformatics sequence file format.

29. The method of claim 23 wherein in step c), the content data of said virtual file is translated from a first bioinformatics database file format to a second bioinformatics database file format.

30. The method of claim 23 wherein in step c), the content data of said virtual file is translated from a first binary executable file format to a second binary executable file format.

31. The method of claim 1 wherein in steps a), b) and c), said request is to read the contents of a file.

32. The method of claim 1 wherein in steps a), b) and c), said request is to write data to a file.

33. The method of claim 1 wherein in steps a), b) and c), said request is to determine the length of a file.

34. The method of claim 1 wherein in steps a), b) and c), said request is to determine the attributes of a file.

35. The method of claim 1 wherein in steps a), b) and c), said request is to change the attributes of a file.

36. The method of claim 1 wherein in steps a), b) and c), said request is to create a file.

37. The method of claim 1 wherein in steps a), b) and c), said request is to delete a file.

38. The method of claim 1 wherein in steps a), b) and c), said request is to rename a file.

39. The method of claim 1 wherein in steps a), b) and c), said request is to create a directory.

40. The method of claim 1 wherein in steps a), b) and c), said request is to delete a directory.

41. The method of claim 1 wherein in steps a), b) and c), said request is to look up a file name in a directory.

42. The method of claim 1 wherein in steps a), b) and c), said request is to determine the list of files in a directory.

43. The method of claim 1 wherein in step c), the content data of said virtual file is generated in real time by utilizing a plug-in function.

44. The method of claim 43 wherein in step c), said plug-in function generates said content data by reading a stored physical file.

45. The method of claim 43 wherein in step c), said plug-in function generates said content data algorithmically.

46. The method of claim 43 wherein in step c), said plug-in function generates said content data by decrypting a stored physical file.

47. The method of claim 43 wherein in step c), said plug-in function generates said content data by decompressing a stored physical file.

48. The method of claim 43 wherein in step c), said plug-in function generates said content data that is dependent upon the user, machine and operating system making the request.

49. The method of claim 43 wherein in step c), said plug-in function generates said content data by querying a database system.

50. The method of claim 49 wherein in step c), said database system is a relational database system.

51. The method of claim 49 wherein in step c), said database system is an object-oriented database system.

52. The method of claim 43 wherein in step c), said plug-in function generates said content data by converting the file format of a stored physical file to a second file format.

53. The method of claim 52 wherein said file formats are word processing file formats.

54. The method of claim 52 wherein said file formats are database file formats.

55. The method of claim 52 wherein said file formats are image or graphics file formats.

56. The method of claim 52 wherein said file formats are molecular structure file formats.

57. The method of claim 52 wherein said file formats are bioinformatics sequence file formats.

58. The method of claim 52 wherein said file formats are bioinformatics database file formats.

59. The method of claim 52 wherein said file formats are binary executable file formats.

60. The method of claim 43 wherein in step c), said content data generated by said plug-in function is binary executables translated from some other non-executable representation.

61. The method of claim 60 wherein in step c), said binary executables are dependent upon the architecture and operating system of the machine making the request.

62. The method of claim 1 wherein in step a), said request comprises a file-read request; and wherein in step c), said content data of said virtual file comprises binary executables translated from a non-executable representation of data.

63. The method of claim 62 wherein in step c), said binary executables are dependent upon the architecture and operating system of the machine making the request.

64. The method of claim 1 wherein in step c), said content data is generated by retrieving data.

65. The method of claim 1 wherein in step c), said content data is generated by modifying data.

* * * * *

UNITED STATES PATENT AND TRADEMARK OFFICE
CERTIFICATE OF CORRECTION

PATENT NO.     : 6,356,863 B1
DATED          : March 12, 2002
INVENTOR(S)    : R.A. Sayle It is certified that error appears in the above-identified patent and that said Letters Patent is hereby corrected as shown below:

<u>Title page,</u>
Insert Item [73] as follows: -- [73] Assignee, Metaphorics, LLC. --

Signed and Sealed this

Fourth Day of February, 2003

JAMES E. ROGAN
*Director of the United States Patent and Trademark Office*